(12) United States Patent
Zalameda et al.

(10) Patent No.: US 11,027,332 B2
(45) Date of Patent: Jun. 8, 2021

(54) SYSTEM AND METHOD FOR IN-SITU CHARACTERIZATION AND INSPECTION OF ADDITIVE MANUFACTURING DEPOSITS USING TRANSIENT INFRARED THERMOGRAPHY

(71) Applicant: U.S.A., as represented by the Administrator of the National Aeronautics and Space Administration, Washington, DC (US)

(72) Inventors: Joseph N. Zalameda, Poquoson, VA (US); Eric R. Burke, Yorktown, VA (US); Robert A. Hafley, Yorktown, VA (US); Christopher S. Domack, Carrollton, VA (US)

(73) Assignee: UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 635 days.

(21) Appl. No.: 15/487,564

(22) Filed: Apr. 14, 2017

(65) Prior Publication Data
US 2017/0297095 A1    Oct. 19, 2017

Related U.S. Application Data

(60) Provisional application No. 62/323,323, filed on Apr. 15, 2016.

(51) Int. Cl.
*B22D 23/00*    (2006.01)
*B33Y 10/00*    (2015.01)
(Continued)

(52) U.S. Cl.
CPC ........... *B22D 23/003* (2013.01); *B22D 46/00* (2013.01); *B22F 3/115* (2013.01); *B33Y 10/00* (2014.12); *B33Y 30/00* (2014.12); *B33Y 50/02* (2014.12)

(58) Field of Classification Search
CPC .... B23K 26/342; B23K 26/034; B33Y 50/02; G05B 2219/49007; G05B 2219/49013;
(Continued)

(56) References Cited

U.S. PATENT DOCUMENTS 4,854,724 A    8/1989  Adams et al.
6,000,844 A    12/1999 Cramer et al.
(Continued)

FOREIGN PATENT DOCUMENTS

WO    WO2015169309 A1    11/2015
WO    WO2015197038 A1    12/2015
(Continued)

OTHER PUBLICATIONS

Zalameda, J. N. et al., "Thermal Imaging for Assessment of Electron-beam Free Beam Fabrication (EBF3) Additive Manufacturing Deposits," Proc. SPIE, May 22, 2013, vol. 8705, pp. 87050M-1-M-8, Thermosense: Thermal Infrared Applications XXXV.
(Continued)

*Primary Examiner* — Geoffrey S Evans
(74) *Attorney, Agent, or Firm* — M. Bruce Harper; Andrea Z. Warmbier; Helen M. Galus

(57) ABSTRACT

Systems and methods are provided for the real time inspection of additive manufacturing deposits using infrared thermography. Various embodiments may enable the measurement of material properties and the detection of defects during the additive manufacturing process. Various embodiments may enable the characterization of deposition quality, as well as the detection of deposition defects, such as voids, (Continued)

cracks, disbonds, etc., as a structure is manufactured layer by layer in an additive manufacturing process. Various embodiments may enable quantitative inspection images to be archived and associated with the manufactured structure to document the manufactured structure's structural integrity.

18 Claims, 14 Drawing Sheets

(51) Int. Cl.

| | | |
|---|---|---|
| *B33Y 30/00* | (2015.01) | |
| *B33Y 50/02* | (2015.01) | |
| *B22F 3/115* | (2006.01) | |
| *B22D 46/00* | (2006.01) | |

(58) Field of Classification Search
CPC ........... G05B 2219/49018; G05B 2219/49023; B22D 23/003; B22D 46/00; B22F 3/115
See application file for complete search history.

(56) References Cited

U.S. PATENT DOCUMENTS

| | | | |
|---|---|---|---|
| 7,168,935 | B1 | 1/2007 | Taminger et al. |
| 8,344,281 | B2 | 1/2013 | Taminger et al. |
| 8,452,073 | B2 | 5/2013 | Taminger et al. |
| 8,471,207 | B2 | 6/2013 | Louban et al. |
| 2009/0152771 | A1* | 6/2009 | Philippi .................. B33Y 10/00 264/410 |
| 2014/0308153 | A1* | 10/2014 | Ljungblad ............. B22F 3/1055 419/53 |
| 2015/0268099 | A1 | 9/2015 | Craig |
| 2016/0303687 | A1* | 10/2016 | Ljungblad ............. B23K 26/032 |
| 2017/0066084 | A1* | 3/2017 | Ladewig ................. G01N 25/72 |
| 2017/0102689 | A1* | 4/2017 | Khajepour ......... G05B 19/4099 |
| 2017/0136574 | A1* | 5/2017 | Zenzinger ............. B29C 64/153 |
| 2018/0169948 | A1* | 6/2018 | Coeck .................... B33Y 50/02 |
| 2019/0022946 | A1* | 1/2019 | Jones ...................... B22F 3/008 |
| 2019/0107443 | A1* | 4/2019 | Yuan ........................ H04N 5/33 |
| 2019/0291345 | A1* | 9/2019 | Boyer ................... B29C 64/386 |
| 2019/0291349 | A1* | 9/2019 | Fornos ................... B33Y 30/00 |

FOREIGN PATENT DOCUMENTS

| | | | | |
|---|---|---|---|---|
| WO | WO-2016131022 | A1 * | 8/2016 | ......... B23K 37/0235 |
| WO | WO2016201390 | A1 | 12/2016 | |
| WO | WO-2017054842 | A1 * | 4/2017 | ........... B29C 64/165 |

OTHER PUBLICATIONS

Taminger, K. et al., "Electron Beam Freeform Fabrication: A Rapid Metal Deposition Process," 3rd Annual Automotive Composites Conference, Society of Plastics Engineers, Sep. 9-10, 2003, Troy, MI.

Seufzer, W. J. et al., "Control of Space-Based Electron Free Form Fabrication," Symposium on Solid Freeform Fabrication, Aug. 6-8, 2007, Published in Proceedings on Solid Freeform Fabrication (SFF) (18th), pvii-ix.

Rodriguez, E. et al., "Integration of a Thermal Imaging Feedback Control System in Electron Beam Melting," W. M. Keck Center for 3D Innovation, Aug. 15, 2012, pp. 945-961, University of Texas at El Paso.

Khan, M. A. et al., "Infrared Thermography as a Control for Welding Process," Proc. SPIE, Mar. 27, 1984, 154-163, vol. 0446, Thermosense VI: Thermal Infrared Sensing for Diagnostics and Control.

Dinwiddie, Ralph B. et al. "Thermographic In-situ Process Monitoring of the Electron Beam Melting Technology used in Additive Manufacturing," Proc. SPIE, May 22, 2013, vol. 8705, pp. 87050K-1-K-9, Thermosense: Thermal Infrared Applications XXXV.

Zalameda, J. N. et al, "Quartz Lamp Characterization for Quantitative Thermal Nondestructive Evaluation," 26th Annual Review of Progress in Quantitative Nondestructive Evaluation (QNDE) edited by D. O. Thompson and D. E. Chimenti, American Institute of Physics Conference Proceedings, Jul. 25-30, 1999, pp. 1689-1896, vol. 19B.

Schlichting, J. et al., "Flying Laser Spot Thermography for the Fast Detection, of Surface Breaking Cracks", 18th World Conference on Nondestructive Testing, Apr. 16-20, 2012, Durban, South Africa.

Zalameda, J. N., "Measured Through-the-Thickness Thermal Diffusivity of Carbon Fiber Reinforced Composite Materials," American Socity for Testing and Materials Journal of Composites Technology and Research, Apr. 1999, pp. 98-102, vol. 21, No. 2.

Sankaran. S. N. et al., "An Understanding of Al Loss During EBF3 Deposition of Ti—Al—4V Alloys from Cross-sectional Geometry and Microanalysis," AeroMat Conference Presentation Slides, Jun. 22, 2010, Bellevue, WA.

Spisz. T.S. et al., "Processing Near-Infrared Imagery of Hypersonic Space Shuttle Reentries," SPIE Defense, Security, and Sensing Symposium, Apr. 5-9, 2010, pp. 766101-766112, Orlando, FL.

Zalameda, J. N., et al. "Application of a Near Infrared Imaging System for Thermographic Imaging of the Space Shuttle During Hypersonic Re-entry," 48th AIAA Aerospace Science Meeting Conference, Jan. 4-7, 2010, pp. 1-17, Orlando, FL.

Boivineau, M. et al. "Thermophysical Properties of Solid and Liquid Ti—Al—4V (TA6V) Alloy," International Journal of Thermophysics, Mar. 2006, pp. 507-529, vol. 27, No. 2.

Khan, M. A. et al., "Infrared Thermography as a Control for Welding Process," Proc. SPIE, Mar. 27, 1984, pp. 154-163, vol. 0446, Thermosense VI: Thermal Infrared Sensing for Diagnostics and Control.

Krauss, H. C. et al., "Thermography for Monitoring the Selective Laser Melting Process," in Proceedings of the 23rd Annual International Solid Freeform Fabrication Symposium, University of Texas, Aug. 22, 2012, pp. 999-1014, Austin, TX.

Seufzer, W. J. et al. "Control of Space-Based Electron Free Form Fabrication," Symposium on Solid Freeform Fabrication, pp. 1-9, Aug. 6-8, 2007, Published in Proceedings on Solid Freeform Fabrication (SFF) (18th).

Shepard, S. et al., "Pulsed Thermographic inspection of Spot Welds", Proc. SPIE, Mar. 26, 1998, pp. 320-324, vol. 3361.

Schlichting, J. et al., "Flying Laser Spot Thermography for the Fast Detection, of Surface Breaking Cracks", 18th World Conference on Nondestructive Testing, pp. 1-7, Apr. 16-20, 2012, Durban, South Africa.

* cited by examiner

SYSTEM AND METHOD FOR IN-SITU CHARACTERIZATION AND INSPECTION OF ADDITIVE MANUFACTURING DEPOSITS USING TRANSIENT INFRARED THERMOGRAPHY

CROSS-REFERENCE TO RELATED PATENT APPLICATION(S)

This patent application claims the benefit of and priority to U.S. Provisional Patent No. 62/323,323, filed on Apr. 15, 2016, the contents of which are hereby incorporated by reference in its entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Additive manufacturing, also referred to as three-dimensional printing (3-D printing), is a rapidly growing technology with numerous applications, from fabrication of space components to rapid production of aerospace parts. In an additive manufacturing process, heat is generally applied to melt a feedstock material, such as plastic or metal. The melted material is then applied, layer by layer, over a given area, for example by moving a translation table or moving a depositing printing head. Common methods to apply heat to the feedstock material are by laser, ultraviolet light, glue gun, etc. Specifically for metals, high power lasers or electron beams are sometimes used to melt the feedstock metals used in additive manufacturing.

Past work has been done related to monitoring additive manufacturing quality using remote temperature measurements. Thermal imaging is used to monitor the quality of the build by measuring the temperature and using that to control the build settings. By monitoring the temperature distribution, the build quality can, with limited success, be determined and controlled.

BRIEF SUMMARY OF THE INVENTION

The present invention described herein provides systems and methods for the real time inspection of additive manufacturing deposits using infrared thermography. Various embodiments may enable the measurement of material properties and the detection of defects during the additive manufacturing process. Various embodiments may enable the characterization of deposition quality, as well as the detection of deposition defects, such as voids, cracks, disbonds, etc., as a structure is manufactured layer by layer in an additive manufacturing process. Various embodiments may enable quantitative inspection images to be archived and associated with the manufactured structure to document the manufactured structure's structural integrity.

Various embodiments of the invention may include the use of an infrared camera system to capture the spatial and temporal thermal response during an additive manufacturing process. The thermal imaging system may capture the melt pool, semi-solid region, and transient thermal response after solidification during material deposition. The melt pool, semi-solid region, and the transient thermal response may be used for closed loop control and/or to perform nondestructive evaluation during the material deposition.

Various embodiments of the invention may include the use of an infrared camera system using multiple synchronized cameras of different imaging wavebands (visible, near infrared, short wave infrared, and/or long wave infrared, etc.) to capture the melt pool, semi-solid region, and transient thermal response for closed loop control and/or to perform nondestructive evaluation during the material deposition. In a further embodiments, the same camera sensor that may be synchronized with different camera settings, such as integration time, gain, etc., to capture the melt pool, semi-solid region, and transient thermal response for closed loop control and/or to perform nondestructive evaluation during the material deposition.

Various embodiments of the invention may include the use of an infrared camera system using multiple synchronized cameras of different imaging wavebands (visible, near infrared, short wave infrared, and/or long wave infrared, etc.) to capture the melt pool, semi-solid region, and transient thermal response for closed loop control and/or to perform nondestructive evaluation during the material deposition.

In various embodiments, one or more thermal cameras may be positioned in-axis to the heat source, such as electron beam, laser, etc. In various embodiments, one or more thermal cameras may be positioned off-axis to the heat source, such as electron beam, laser, etc. In various embodiments, combinations of one or more in-axis camera and one or more off-axis camera may be used to capture the melt pool, semi-solid region, and transient thermal response for closed loop control and/or to perform nondestructive evaluation during the material deposition.

Various embodiments of the invention may include thermal nondestructive evaluation being performed using image processing techniques to calculate the temporal thermal response at a given spatial point and to use thermal models or processing techniques, such as principal component analysis, time derivative, etc. The thermal models may be used to calculate material properties or physical dimensions, such as layer thickness. The material property or layer thickness may be displayed as an image to detect anomalies corresponding to defects. The processing techniques may be used to process the data into an inspection image and to improve defect contrast within that image.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION OF THE INVENTION

Figure 1A:
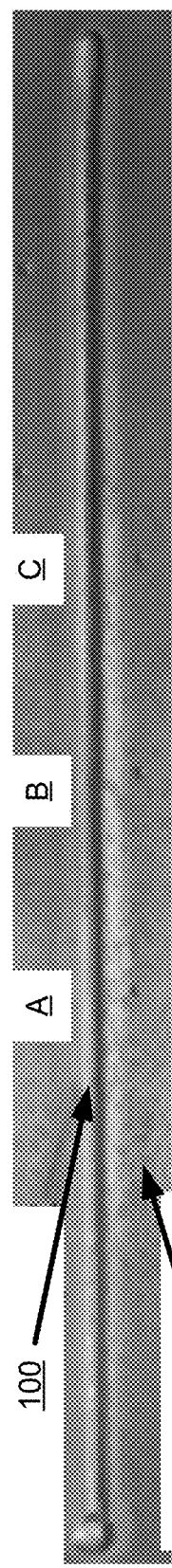
FIG. 1A is a photograph of a single layer build over an area of defects within a stainless steel base plate.

It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In an additive manufacturing process (also referred to as a 3-D printing process), thermal imaging may be used to monitor the quality of the build by measuring the temperature response and using that response to control the build settings. By monitoring the temperature distribution, the build quality may be determined and controlled using a feedback control system. In addition, flaws may be detected by measuring the temperature hot spots or a temperature profile along the deposit. The temperature profiles may be compared to a reference "good" profile to detect metal deposit defects based on the differences between the built structure and the reference profile. These temperature measurement techniques may be based on measured intensity (irradiance) differences where a hot spot can be an indication of a defect.

In an example additive manufacturing process, such as an Electron Beam Freeform Fabrication (EBF$^3$) process, an electron beam may be used to melt a feedstock of wire (e.g., stainless steel) onto a metal base. The base may be mounted onto a translation table. The structure to be built (e.g., the part to be built) may be built layer by layer as the metal is deposited onto the moving base. The melted metal wire may form a molten pool area on the base as the melted metal is deposited. At the transition point, the metal solidifies or freezes at a given constant temperature. This area is known as the semi-solid area or tail section. After the metal solidifies a transient cool down takes place where the heat is then primarily transferred by conduction into previous layers or a base plate on which the layers are being built. This transient response is typically used in thermal nondestructive evaluation where the decay in temperature is related to the thermal properties of the material and the thickness.

A thermal imager may record the temperature response of the structure being built in an additive manufacturing process, pixel by pixel, over a given area in the field of view of the thermal imager. There may be drawbacks to the measurement of only pixel intensity counts or temperature by a thermal imager. Many factors, such as emissivity differences, uneven temperature distributions within the melt pool, infrared reflections, edge effects, changing viewing angle, etc., may cause changes in the measured irradiance and may not be related to underlying defects or abnormal build settings. This may lead to errors in identifying improper build parameters or defects when using only pixel intensity counts or temperature in current systems. For example, a hot spot can be due to a defect such as porosity but can be difficult to differentiate in a typical thermography image of a deposit used in current systems. A flawed location may be identified by a hot spot or a secondary peak in temperature in such current systems. This anomaly may be identified by a line plot reference of a good area compared to the suspect line plot. The irradiance peak can be subject to the existence of irregularities, as well as flaws, and therefore the robustness is subjected to considerable fluctuations. This is due to the thermally dynamic nature of the deposition building process.

For each acquired image along the feedstock (e.g., metal) deposition acquired by the thermal imager in an additive manufacturing process, certain metrics can be obtained in current systems, such as molten pool area, tail area average pixel intensity counts, tail area size and molten pool average pixel intensity. For each horizontal line plot within the acquired image, these metrics can be calculated and assembled into a final inspection image over the given deposit length by averaging or counting the pixel intensity values within a given range in current systems. Each acquired image therefore represents a column of data for the resulting inspection image in current systems. As examples, final inspection images based on molten pool area, tail average intensity counts, tail area, and molten pool average value may be generated in current systems. While some of the final inspection images in current systems, such as the tail area inspection image, may be able to detect defects, the shapes of the defects may not be accurate in current systems. For example, this may be due to heat buildup before crossing the thin base plate boundary resulting in a tail section area growing (i.e., time to solidify increases due to the heat buildup). It would be expected that the melt pool area size or average intensity value would increase over the defect areas; however, current systems techniques may not be sensitive to these defects. Thus, the current processing techniques of measuring molten pool area size, tail average intensity counts, tail size, and average value of molten pool may not be reliable methods for detection of the defects both in sensitivity and determining the size.

Various embodiments may provide systems and methods for the real time inspection of additive manufacturing deposits using infrared thermography. Various embodiments may enable the measurement of material properties and the detection of defects during the additive manufacturing process. Various embodiments may enable the characterization of deposition quality, as well as the detection of deposition defects, such as voids, cracks, disbonds, etc., as a structure is manufactured layer by layer in an additive manufacturing process. Various embodiments may enable quantitative inspection images to be archived and associated with the manufactured structure to document the manufactured structure's structural integrity.

Various embodiments of the invention may include the use of an infrared camera system to capture the spatial and temporal thermal response during an additive manufacturing process. The thermal imaging system may capture the melt pool, semi-solid region, and transient thermal response after solidification during material deposition. The melt pool, semi-solid region, and the transient thermal response may be used for closed loop control and/or to perform nondestructive evaluation during the material deposition.

Various embodiments of the invention may include the use of an infrared camera system using multiple synchronized cameras of different imaging wavebands (visible, near infrared, short wave infrared, and/or long wave infrared, etc.) to capture the melt pool, semi-solid region, and transient thermal response for closed loop control and/or to perform nondestructive evaluation during the material deposition. In a further embodiments, the same camera sensor that may be synchronized with different camera settings, such as integration time, gain, etc., to capture the melt pool, semi-solid region, and transient thermal response for closed loop control and/or to perform nondestructive evaluation during the material deposition.

Various embodiments of the invention may include the use of an infrared camera system using multiple synchronized cameras of different imaging wavebands (visible, near infrared, short wave infrared, and/or long wave infrared, etc.) to capture the melt pool, semi-solid region, and transient thermal response for closed loop control and/or to perform nondestructive evaluation during the material deposition.

In various embodiments, one or more thermal cameras may be positioned in-axis to the heat source, such as electron beam, laser, etc. In various embodiments, one or more thermal cameras may be positioned off-axis to the heat source, such as electron beam, laser, etc. In various embodiments, combinations of one or more in-axis camera and one or more off-axis camera may be used to capture the melt pool, semi-solid region, and transient thermal response for closed loop control and/or to perform nondestructive evaluation during the material deposition.

Various embodiments of the invention may include thermal nondestructive evaluation being performed using image processing techniques to calculate the temporal thermal response at a given spatial point and to use thermal models or processing techniques, such as principal component analysis, time derivative, etc. The thermal models may be used to calculate material properties or physical dimensions, such as layer thickness. The material property or layer thickness may be displayed as an image to detect anomalies corresponding to defects. The processing techniques may be used to process the data into an inspection image and to improve defect contrast within that image.

Real time inspection, during the additive manufacturing process may be performed using one or more infrared sensors to measure the transient heat flow response during the manufacturing process. Measuring the transient heat flow response may provide systems and methods more sensitive to defects in comparison to systems and methods that merely measure the temperature alone. Defects, such as a cracks, delamination damage, voids, etc., block the heat flow and therefore cause a change in the transient heat flow response.

In various embodiments, to obtain the transient response for a given pixel within the acquired infrared data, image data reconstruction may be required. The data reconstruction may require the images obtained sequentially in time be processed (using velocity and direction information) to determine temporal temperature response at a specific location over the entire deposit time period. The recorded transient temperature response, at a given pixel point, may then be obtained along the entire build layer by layer. The recorded transient temperature response may be analyzed in real time for detection of defects. In various embodiments, a thermal model may be fitted to the data to obtain quantitative material property measurements or physical dimension measurement such as thickness. For example, the thermal model may be used to quantify the mixture of multi-material deposits for desired material properties of the deposition. In addition, when multiple infrared sensors are used, the images may be combined for improved spatial coverage/resolution and increased signal to noise ratio.

In various embodiments, defects, such as in-plane cracks, delamination damage, voids, etc., may block the heat flow and therefore cause a change in the transient heat flow response when a structure is heated and/or cooled. Defects, such as a cracks, delamination damage, voids, etc., may significantly affect structural performance. The recorded transient temperature response may be corrected for emissivity differences or reflected background infrared energy. The transient thermal response may then be normalized so the measurement is independent of temperature offsets and the shape of the cool down or heat up curve may be analyzed, pixel by pixel, for material deposition build quality. The shape of the transient response may be an exponential decay in irradiance. The transient response may be a function of the thickness of the layer material and the thermal diffusivity. Thermal diffusivity may be proportional to thermal conductivity and inversely proportional to density and specific heat. Changes in deposition layer thickness or geometry may affect the transient response. Defects, such as cracks, porosity, or layer disbonds, etc., may affect the thermal diffusivity and therefore change the transient thermal response. In addition, thermal diffusivity may be a material property and if different materials are replaced or combined then the thermal diffusivity will change. Measuring the transient response of the thermal cool down curve may be a more effective way of determining flaws or deposition quality during the build process.

Figure 1B:
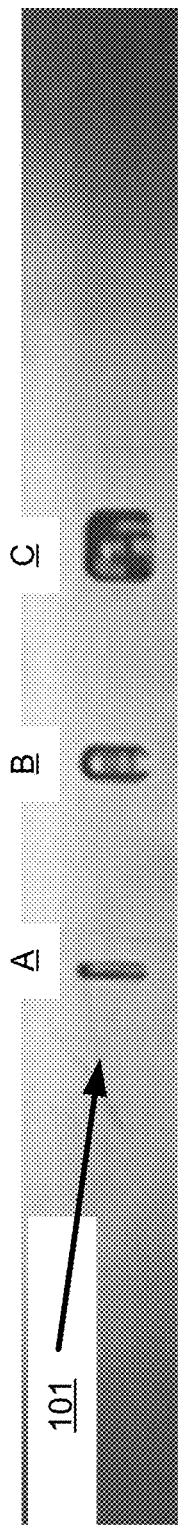
FIG. 1B is a photograph of the back of the base plate of FIG. 1A showing the defects.
Figure 1C:
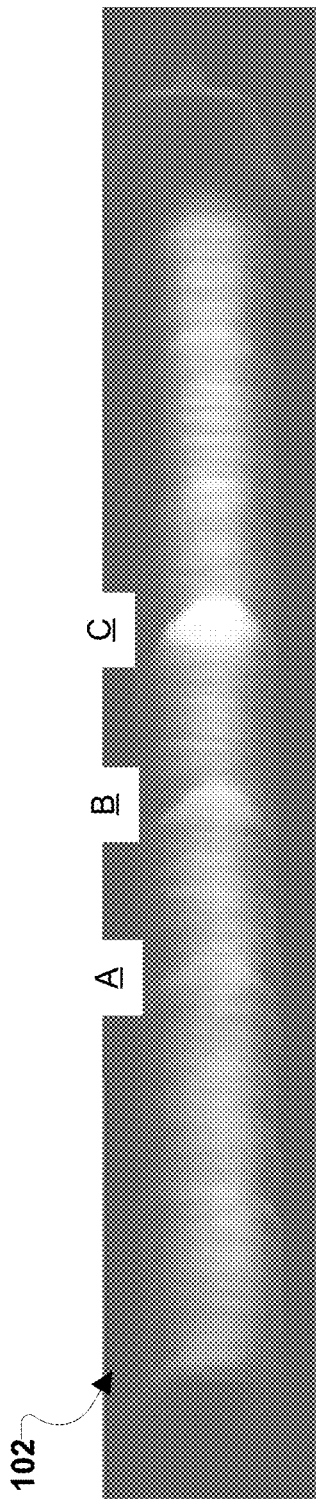
FIG. 1C is a tail area inspection image of the single layer build of FIG. 1A.
Figure 1D:
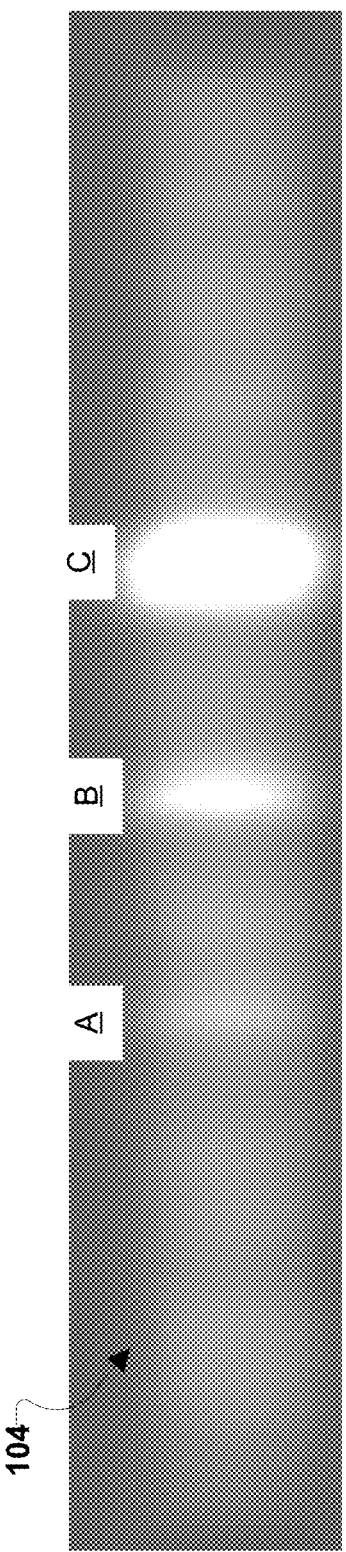
FIG. 1D is a transient inspection image of the single layer build of FIG. 1A.

FIGS. 1A-1D illustrate how measuring the transient response of the thermal cool down may provide a more effective flaw determination and deposition quality determination than tail area inspection techniques. FIG. 1A is a photograph of a single layer build 100 over an area of defects A, B, and C within a stainless steel base plate 101. FIG. 1B is a photograph of the back of the base plate 101 showing the defects A, B, and C. The defects A, B, and C are material loss areas of different size areas. The material loss defects A, B, and C may represent porosity, a layer disbond, or an in-plane crack. The base plate 101 illustrated in FIGS. 1A and 1B was made with overall thickness of 0.64 cm. Defect areas A, B, and C with residual thicknesses of 0.254 cm with different rectangular size areas of 0.32 cm×1.27 cm (A), 0.64 cm×1.27 cm (B), and 1.27 cm×1.27 cm (C) were made on the plate 101 backside. A single deposit layer is approximately 0.185 cm so a residual thickness on that order would correspond to a disbond between successive build layers and a greater thickness would correspond to defects under multiple layers. Thermal images of the single layer build 100 were taken and for each acquired image along the single layer build 100 tail area size was calculated and assembled into a final inspection image 102 of the tail area over the single layer build 100 length by averaging or counting the pixel intensity values within a given range as illustrated in FIG. 1C. The tail area inspection image 102 is able to detect the three defects A, B, and C, however their shapes are not accurate. This is due to the heat buildup before crossing the thin base plate 101 boundary resulting in the tail section area growing (time to solidify increases due to the heat buildup). In comparison, the transient response of the line plot cool down curve may be averaged spatially over the transient cool down for each acquired image to form a final transient inspection image. For each line plot the spatially averaged transient cool down may be determined and assembled into a final transient inspection image 104 over the single layer build 100 length as illustrated in FIG. 1D. As shown in the transient inspection image 104 of FIG. 1D, the defects A, B, and C are clearly detected and more representative of their size and shape as compared to the tail area inspection image 102 shown previously in FIG. 1C.

Figure 2A:
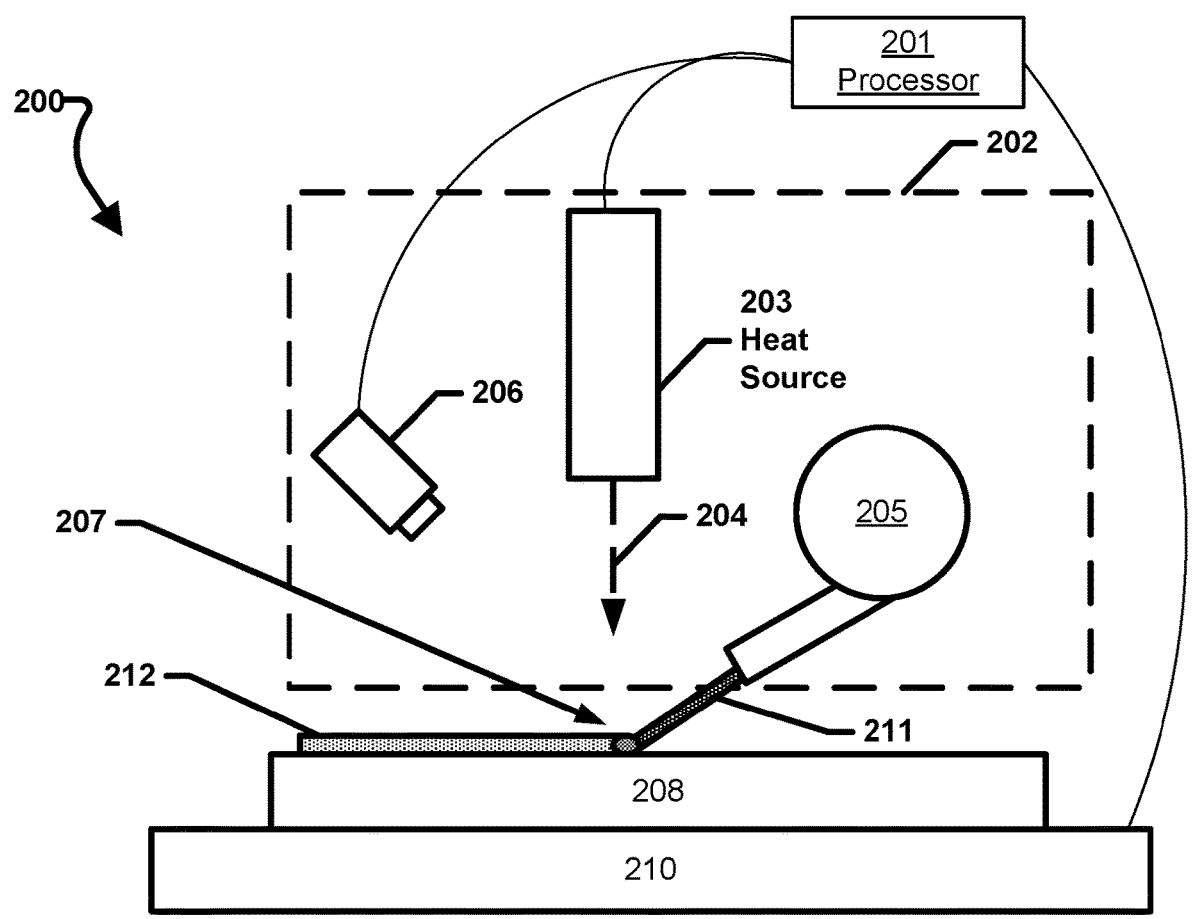
FIG. 2A illustrates a side view of an embodiment additive manufacturing system.
Figure 2B:
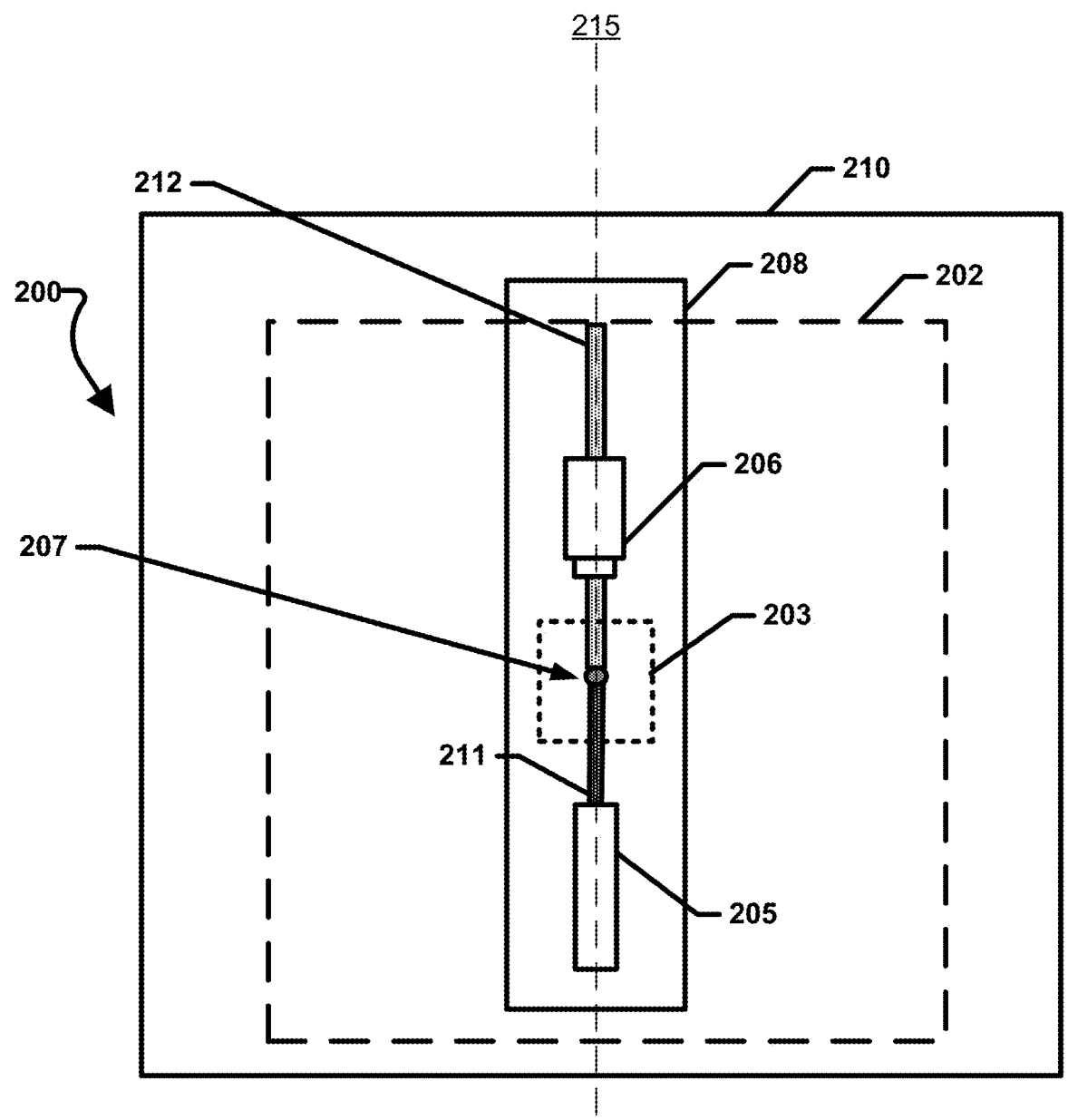
FIG. 2B illustrates a top view of the embodiment additive manufacturing system of FIG. 2A.

For metal additive manufacturing, the deposition head, or the part being built, or both the deposition head and the part being built, may be moved during the material deposition. For example, FIG. 2A illustrates a side view of an embodiment additive manufacturing system 200 and FIG. 2B illustrates a top view of the additive manufacturing system 200. With reference to FIGS. 2A and 2B, the additive manufacturing system 200 may include a moving deposition head 202 including a heat source 203, such as an electron beam gun, laser, etc. Feedstock, such as metal or plastic, may be provided for deposition from a wire feeder 205. Layers may be built up on a base 208 supported on a table 210, such as an X, Y, Z, or rotational translation table. The system 200 may also include one or more thermal imagers 206, such as one or more infrared camera or other type imaging sensor, mounted on/in the deposition head 202. The one or more thermal imagers 206 may each capture different wavebands. For example, the thermal imager 206 may be a short wave infrared camera paired with a visible/near infrared camera. The one or more thermal imagers 206 may each include one or more cameras configured for different wavebands, such as visible, near infrared, short wave infrared, mid-wave infrared, long wave infrared, etc. Various mirrors and/or beam splitters may enable imaging of a wide temperature range by the one or more cameras configured for different wavebands, such as visible, near infrared, short wave infrared, mid-wave infrared, long wave infrared, etc., included in the thermal imager 206. The heat source 203, wire feeder 205, one or more thermal imagers 206, and table 210 may be connected to a processor 201 (not illustrated in FIG. 2B for clarity), such as a microcontroller, that may be configured with processor executable instructions to control the operations of any one or more of the heat source 203, wire feeder 205, one or more thermal imagers 206, and table 210, as well as to receive and process data from any one or more of the heat source 203, wire feeder 205, one or more thermal imagers 206, and table 210. As an example, the processor 201 may receive images acquired from the one or more thermal imagers 206 and process those images to detect defects in and/or the quality of the build as described herein. In response to detecting defects and/or in response to the determined quality, the processor 201 may control the heat source 203, wire feeder 205, and/or table 210 to adjust (e.g., improve) the build as material is deposited. In this manner, the images acquired by the one or more thermal images 206 and processed by the processor 201 may be used by the processor 201 in a control loop to control the build parameters. Additionally, the processor 201 may be configured with processor executable instructions to track and flag concern areas in the build for post build inspection.

In operation, the heat source 203, such as an electron beam gun, may output heat 204, such as an electron beam, to melt the wire feedstock 211 exiting the wire feeder 205 forming a weld pool 207 of material below the moving deposition head 202 on the base 208 and/or on previously deposited layers of material 212 and the moving deposition head 202 and/or table 210 are moved. The one or more thermal imagers 206 may record temperature images during operation of the system 200 and may send the acquired images to the processor 201 for analysis, processing, and/or storage.

When the one or more thermal imagers 206 are mounted to the deposition head 202 along with the heat source 203 along the same axis with the heat source 203 optically and wire feeder 205, as shown in FIG. 2B mounted along axis 215 (i.e., an in-axis configuration), then the entire deposition process may be monitored layer by layer. The recorded temperature images may measure the transient response over the entire area build. By tracking the thermal response during the complete additive manufacturing build, the transient thermal response may be captured using the one or more thermal imagers 206, such as one or more infrared imaging sensors, for the entire build layer by layer. This may result in a nondestructive evaluation (NDE) inspection image along the entire deposit. While shown as mounted in-axis in FIG. 2B, the one or more thermal imagers 206 may also be mounted off-axis (i.e., not in the same axis 215 as the heat source 203 and wire feeder 205), and/or in combinations of both on-axis and off-axis (e.g., with at least one thermal imager 206 mounted in-axis and at least one thermal imager 206 mounted off-axis).

Figure 3:
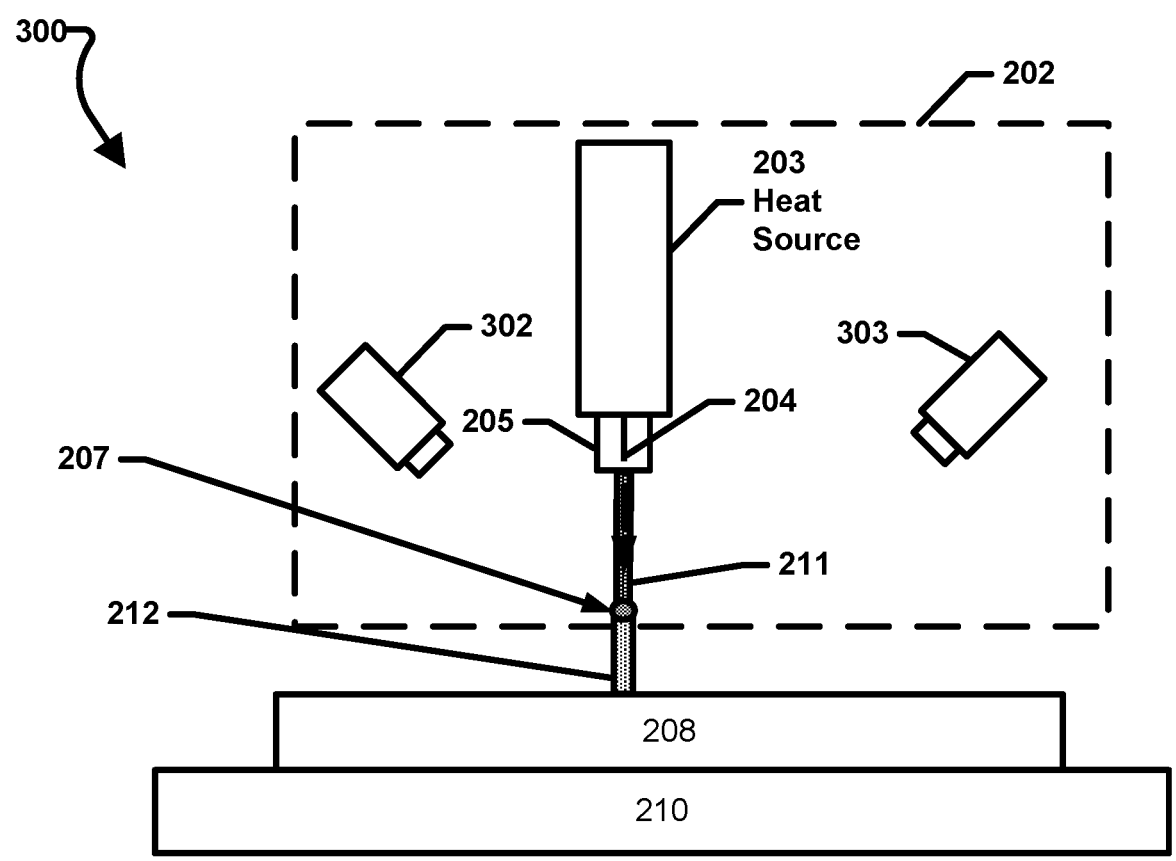
FIGS. 3 and 4 illustrate front views of an embodiment additive manufacturing system.
Figure 4:
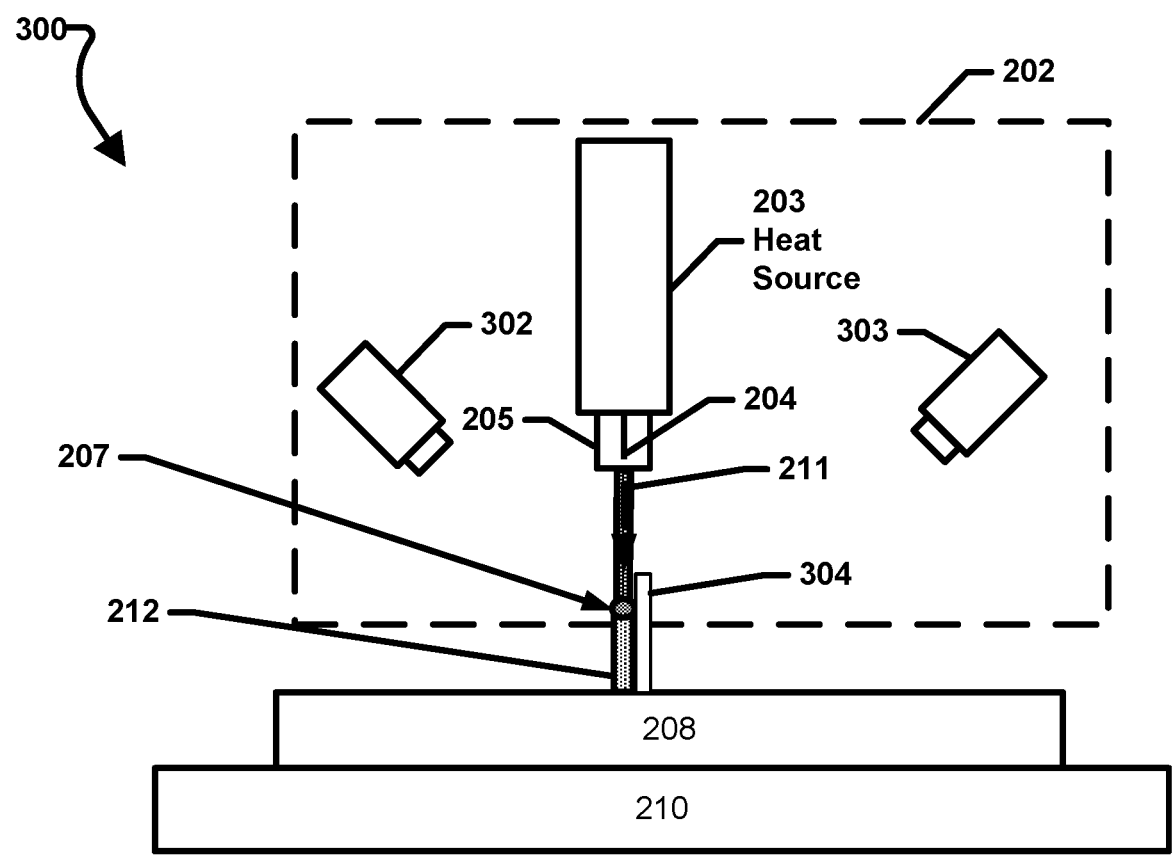

Depending on the deposit direction in relation to the wire deposit, an array of infrared cameras, such as two or more cameras, may be necessary to capture the transient response and to account for view angle. This may be the case if the single camera view is blocked by the wire feed nozzle or if the view is blocked by an adjacent wall. A multi-camera system mounted on the deposition head, as shown in FIG. 3, may capture the thermal transient response for all deposit directions and also account for adjacent wall deposits as shown in FIG. 4. FIGS. 3 and 4 illustrate front views of an embodiment additive manufacturing system 300. System 300 may be similar to system 200 described above with reference to FIGS. 2A and 2B, except that system 300 may include an array of at least two thermal imagers 206, such as two infrared cameras 302 and 303 in the deposition head 202. The two cameras 302 and 303 may be connected to the processor 201 as previously described, though the processor 201 is not shown in FIGS. 3 and 4 for ease of illustration. The two cameras 302 and 303 mounted on/in the deposition head 202 may capture the thermal transient response for all deposit directions and also account deposits adjacent to a wall 304 as at least one of the view fields of the two cameras 302 and 303 may not be blocked by the wall 304.

Figure 5:
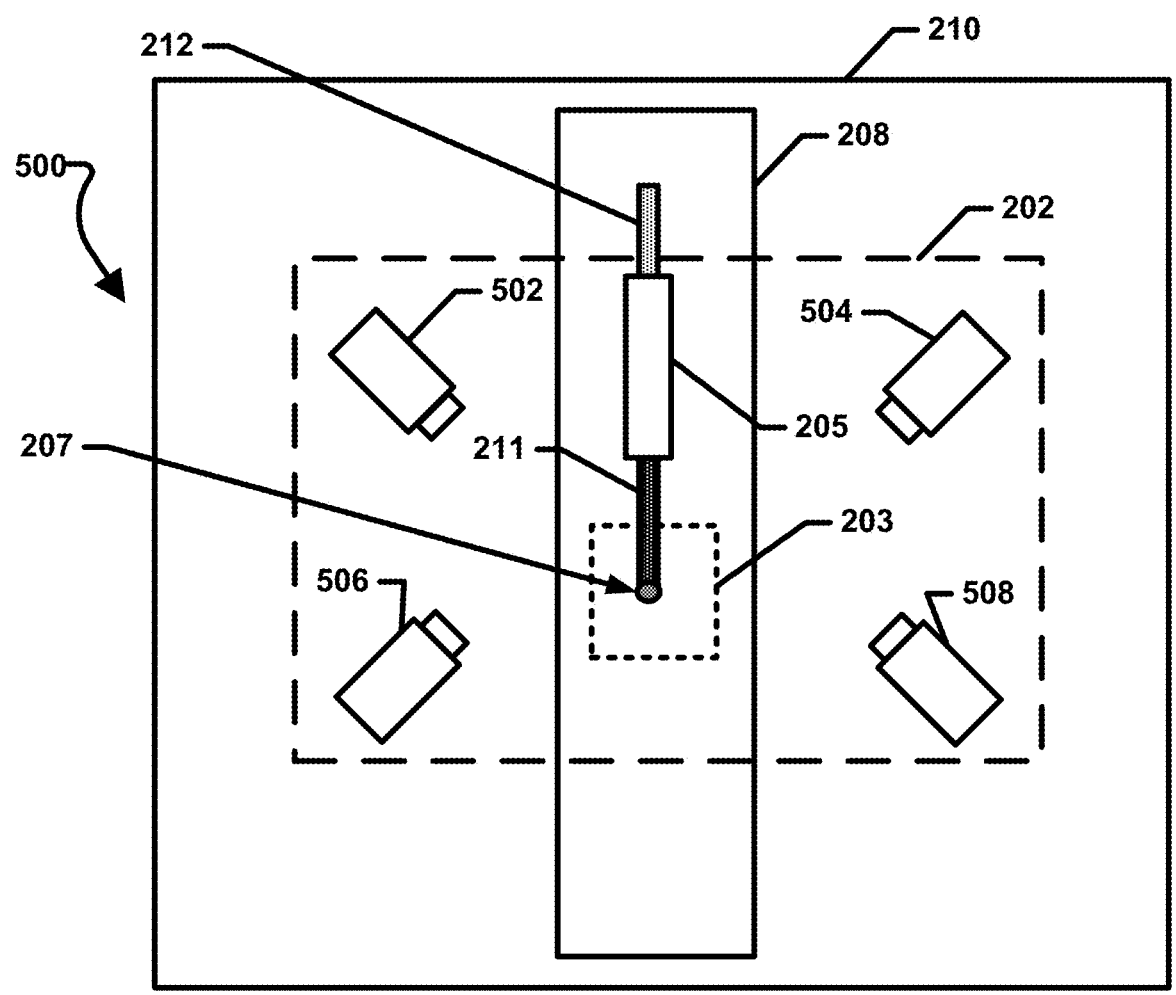
FIG. 5 illustrates a top view of an embodiment additive manufacturing system.

In various embodiments, the infrared camera array, in/on the deposition head 202 containing the heat source 205, such as an electron beam gun, laser, etc., and wire feed 205, may include multiple sensors as required to obtain the complete thermal response of the build. FIG. 5 illustrates a top view of such an embodiment system 500, including four infrared cameras 502, 504, 506, and 508 positioned in an "X" pattern. System 500 may be similar to system 300 described above with reference to FIGS. 3 and 4, except that system 500 may include an array of at least four thermal imagers 206, such as four infrared cameras 502, 504, 506, and 508 in the deposition head 202. The four infrared cameras 502, 504, 506, and 508 may be connected to the processor 201 as previously described, though the processor 201 is not shown in FIG. 5 for ease of illustration. While illustrated as an "X" pattern, when more than four sensors are used, the sensors may be configured in a circular ring. In various embodiments, by using more than one sensor, the images may be combined to improved resolution and temperature sensitivity. In addition, the side views provided by the different sensors, may allow for capture of the thermal transient response along the inner and outer deposit walls. This information may significantly enhance the ability to monitor the quality of complex builds, as well as provide information about the deposition geometry.

Figure 6:
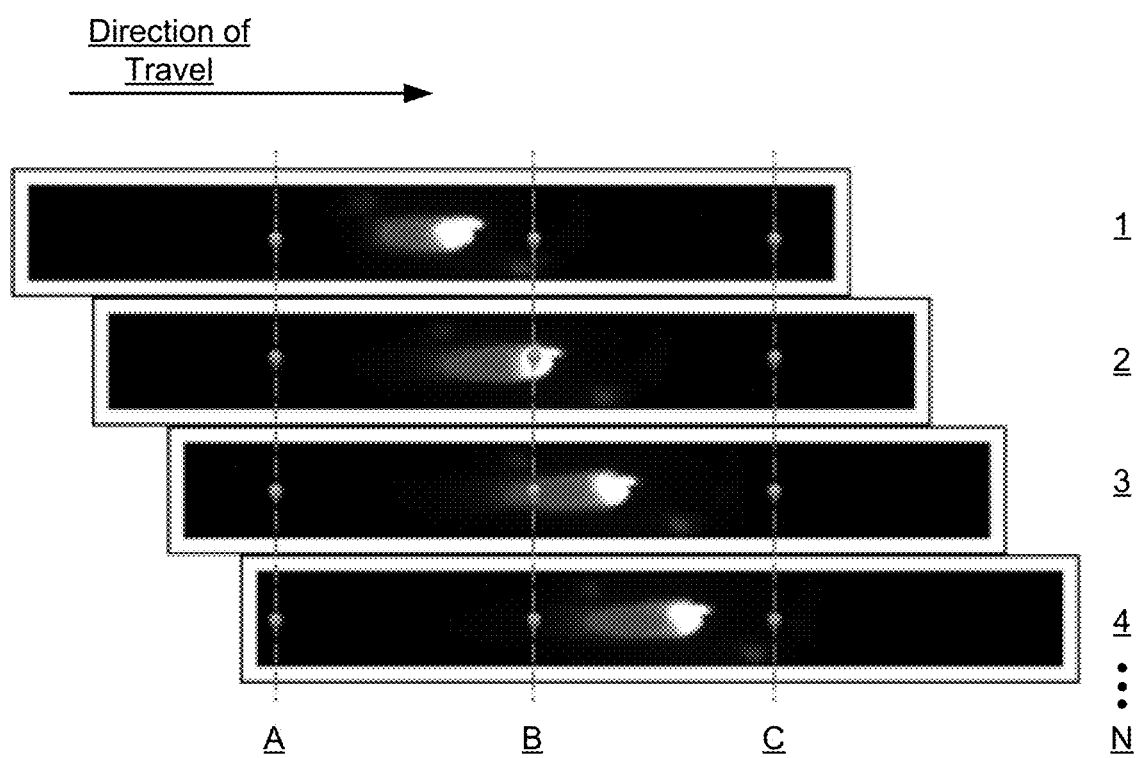
FIG. 6 illustrates an example of image data reconstruction by combining acquired infrared images sequentially.
Figure 7:
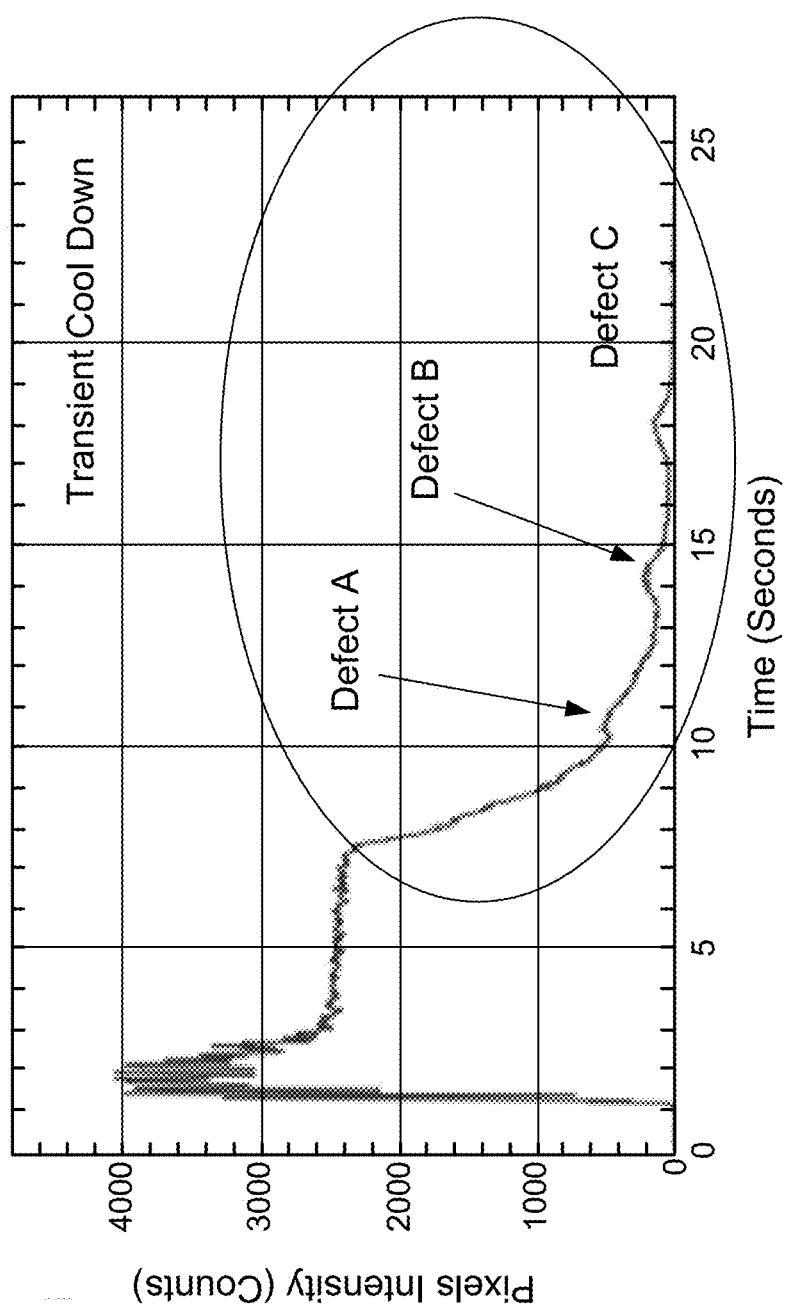
FIG. 7 is a graph of pixel intensity versus time illustrating a temporal temperature response for pixel locations.

In various embodiments, to obtain the transient response for a given pixel within the acquired image data, reconstruction may be required. In various embodiments, reconstruction and other processing of the images described herein may be performed by the processor 201 connected to the one or more thermal imagers 206 which may be configured with processor executable instructions to perform the reconstruction, analysis, and other thermography operations described herein. The data reconstruction may require the images obtained sequentially in time be combined to represent the entire deposit length spatially. This may be done by shifting each acquired image in the direction of travel and this may define each image within the data reconstructed image stack. For circular deposits, the images may be shifted in both X and Y directions. For a straight-line deposit, the reconstruction is illustrated in FIG. 6, where the shifted images 1, 2, 3, 4 of images 1-N are combined. The transient response can then be obtained for pixel points, such as pixel points at defects A, B, and C as discussed above. The respective temperature vs. time curves, for pixel points at defects A, B, and C from FIG. 6, are illustrated in FIG. 7. The intensity counts may be plotted as a function of time for a given pixel point location. With radiometric calibration, the intensity counts may be converted to temperature.

The advantage of measuring temperature versus time along the area of the build may be that quantitative information can be extracted. For example, thermal models may be fitted to the data to determine the thermal properties of the deposition. The thermal models may be based on a moving point source of heat on a slab of finite thickness. The temperature may then be a function of velocity, time, x-y position, thickness of slab, thermal diffusivity and thermal conductivity. If the thermal properties of the deposited material are known, then layer thickness may be determined. If there is a defect such as a crack between layers then the conduction of heat will be restricted and therefore the layer thickness will be less thus providing and indication of a flaw. The rate of the transient cool down may be determined by the material thermal properties. Porosity may affect the thermal conductivity of a material. In addition, there has been recent work in tailored structures with multifunctional performance by multiple wire deposition techniques. By controlling the feed rates of different metal wires, unique structural properties can be developed. In most cases, the thermal properties will change due to the mixture of different metals or materials and this may be measured using a thermal model that allows for the thermal conductivity to take into account the thermal properties of a two-phase system. Along the deposition, the temperature is shown to increase as the melt pool travels over a given pixel point. The metal solidifies at a constant temperature or pixel intensity after the melt pool passes over. Once solidification is complete, the transient cool down response may be measured.

Figure 8:
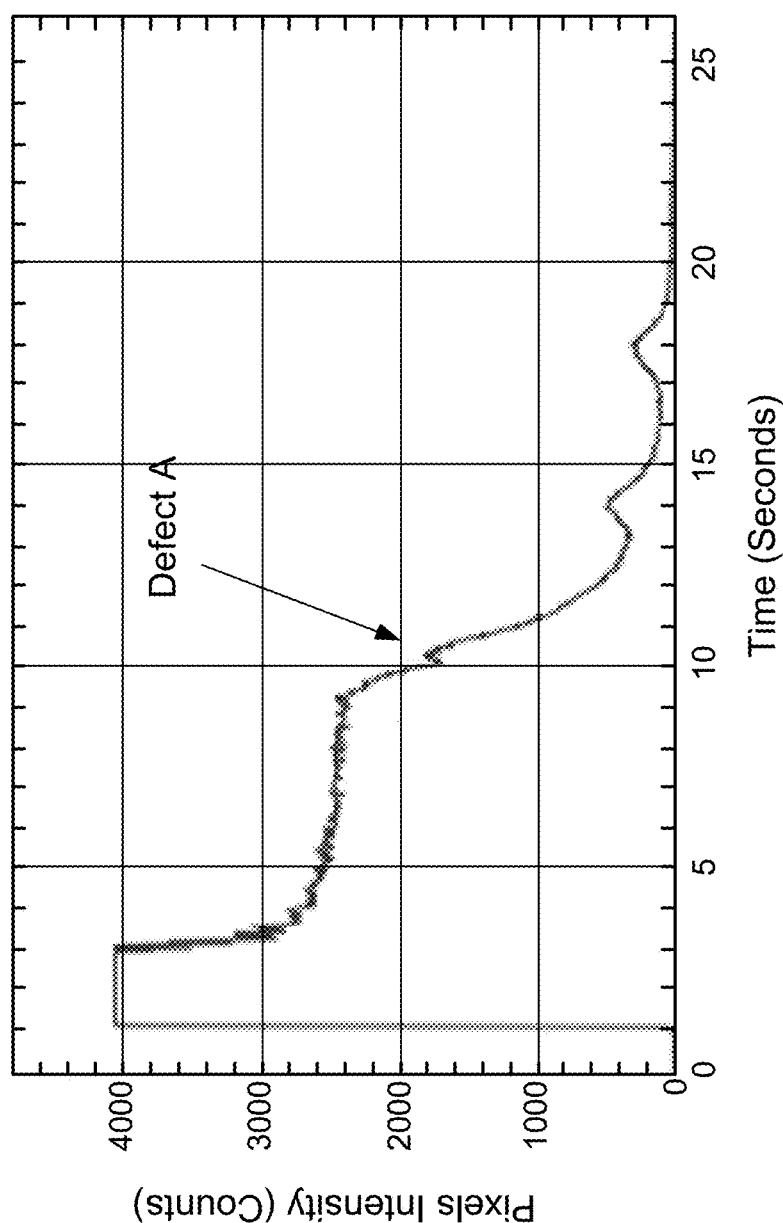
FIGS. 8, 9, and 10 are graphs of pixel intensity versus time illustrating a temporal temperature response for respective single pixel locations of FIG. 7.
Figure 9:
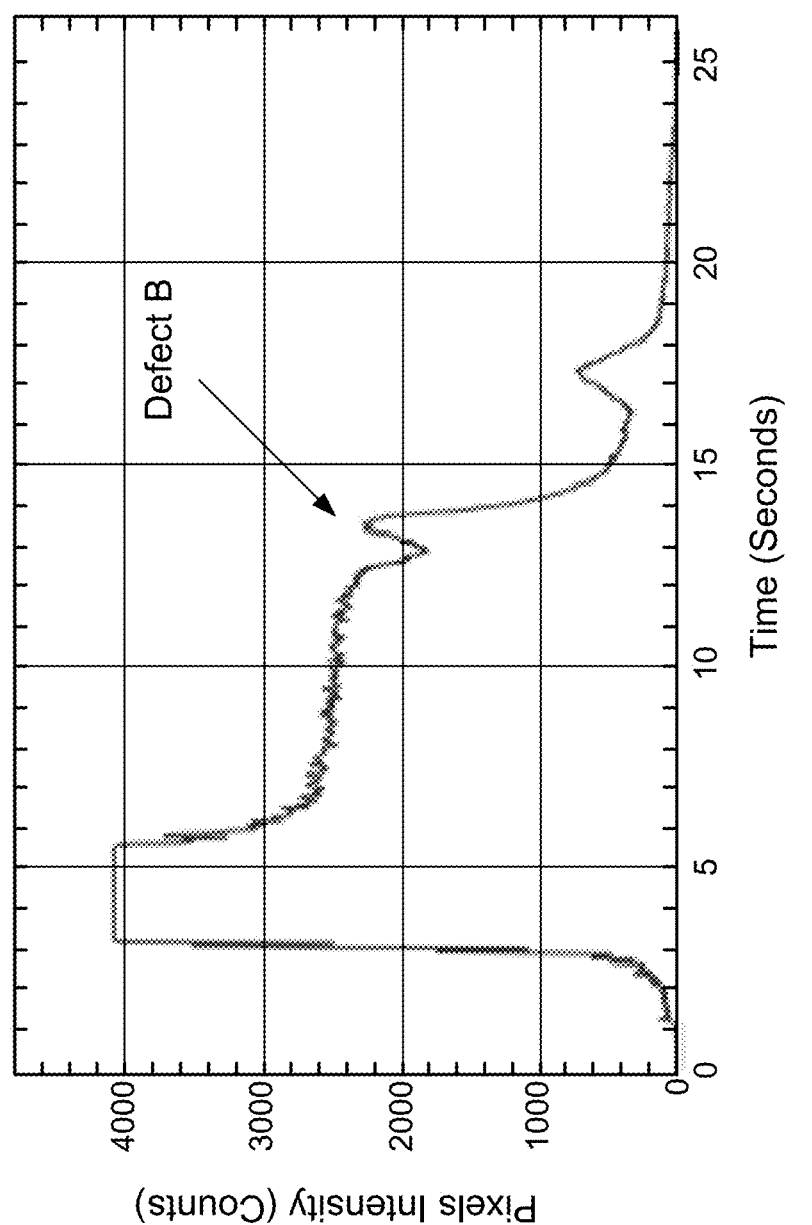
Figure 10:
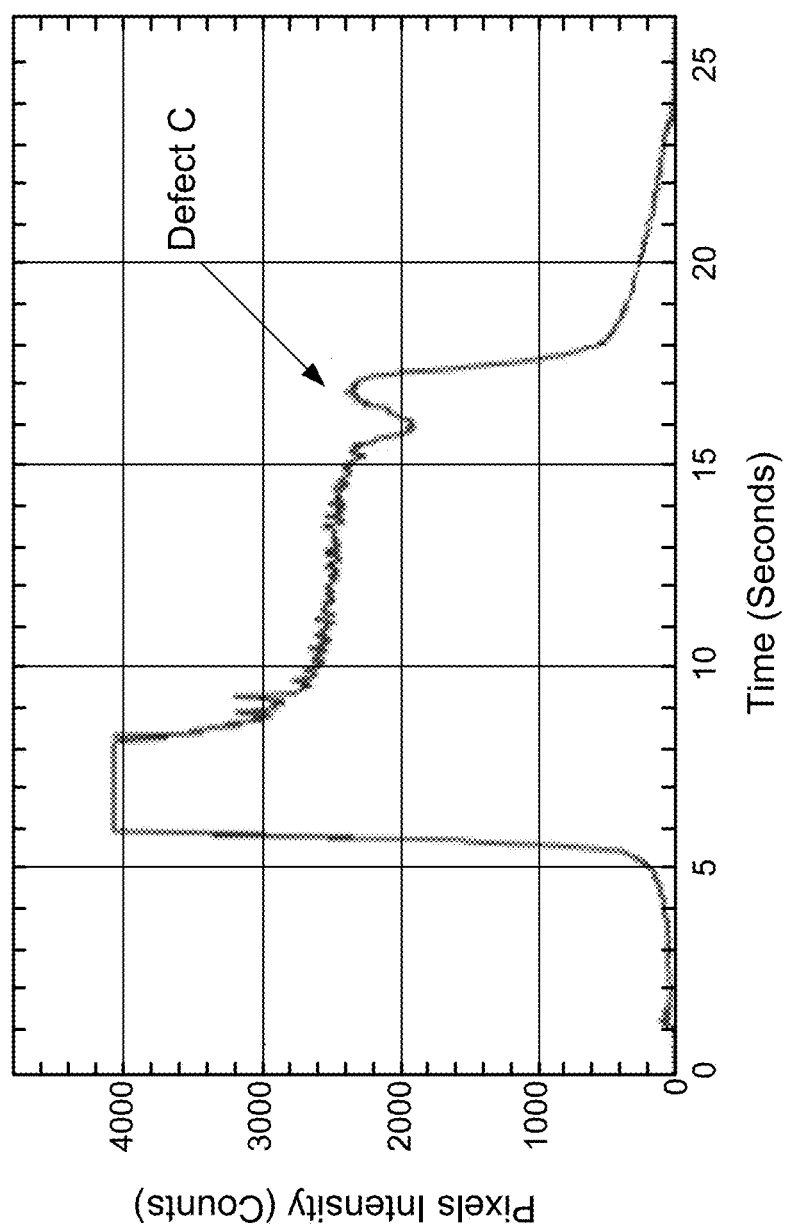

The defects A, B, and C discussed above, may also be detected using the temperature vs. time curves. The defects represent material loss, which may represent porosity, a layer disbond or an in-plane crack. A temperature vs. time curve may be plotted at a pixel location before the three defects. The changes in the transient cool down caused by the three defects may be clearly seen in FIG. 7 where a pixel point is located in line before the three defects. The transient cool down may be clearly affected by the change in heating due to the deposition over the thin areas. This is also shown in the temporal plots at selected pixel points close to the defects A, B, and C as shown in FIGS. 8, 9, and 10 respectively. The transient cool down is abruptly changed by each of the defects, A, B, and C.

Various embodiments may provide systems and methods for inspection of a material or structure during the additive manufacturing deposition process. The various embodiments may use the heat associated with an additive manufacturing deposition process for thermal inspection. Various embodiments may use an infrared camera to capture the thermal response of the additive manufacturing process. Various embodiments may use an infrared camera mounted onto the additive manufacturing deposition head (including the material feed and heat source), such that the entire thermal response of the deposition, layer by layer may be captured. Various embodiments may include obtaining thermal imagery and processing the imagery based on spatial analysis (temperature versus position) of the transient cool down after solidification for detection of defects. Various embodiments may include reconstructing the acquired thermal imagery to obtain temperature versus time and position and providing the transient response (temperature versus time) anywhere along the entire build layer by layer. Various embodiments may include processing of the reconstructed data for detection of defects by analysis of the transient cool down for any position along the deposit layer by layer. Various embodiments may include using of the reconstructed data for closed loop control of deposition parameters to improve the build in real time. Various embodiments may include using the reconstructed data to flag concern areas during the build for post build inspection. Various embodiments may include using more than one infrared camera mounted to the deposition head, thus providing full coverage of the build process without blind spots captured independent of build direction, layer by layer. Various embodiments may use the multi-camera system using different wave bands or multi-cameras with different settings (integration time, gain, etc.) to improve spatial and temperature resolution. Various embodiments may use the multi-camera system to capture the transient thermal response of the inner and outer walls of the deposition to allow for full field nondestructive evaluation of a deposit. Various embodiments may use the multi-camera system to capture the geometry of the deposit. Various embodiments may include comparing the full coverage transient temperature response (temperature versus time) anywhere along the entire deposition, layer by layer to a thermal model. In various embodiments, the thermal model may be a function of parameters such as time, deposit direction, deposit velocity, thermal conductivity of feed material, thermal diffusivity of feed material, and/or deposit geometry, and may be used to quantify defects detected. In various embodiments, the thermal model may be used to quantify the mixture of multi-material deposits for desired material properties of the deposition.

Figure 11:
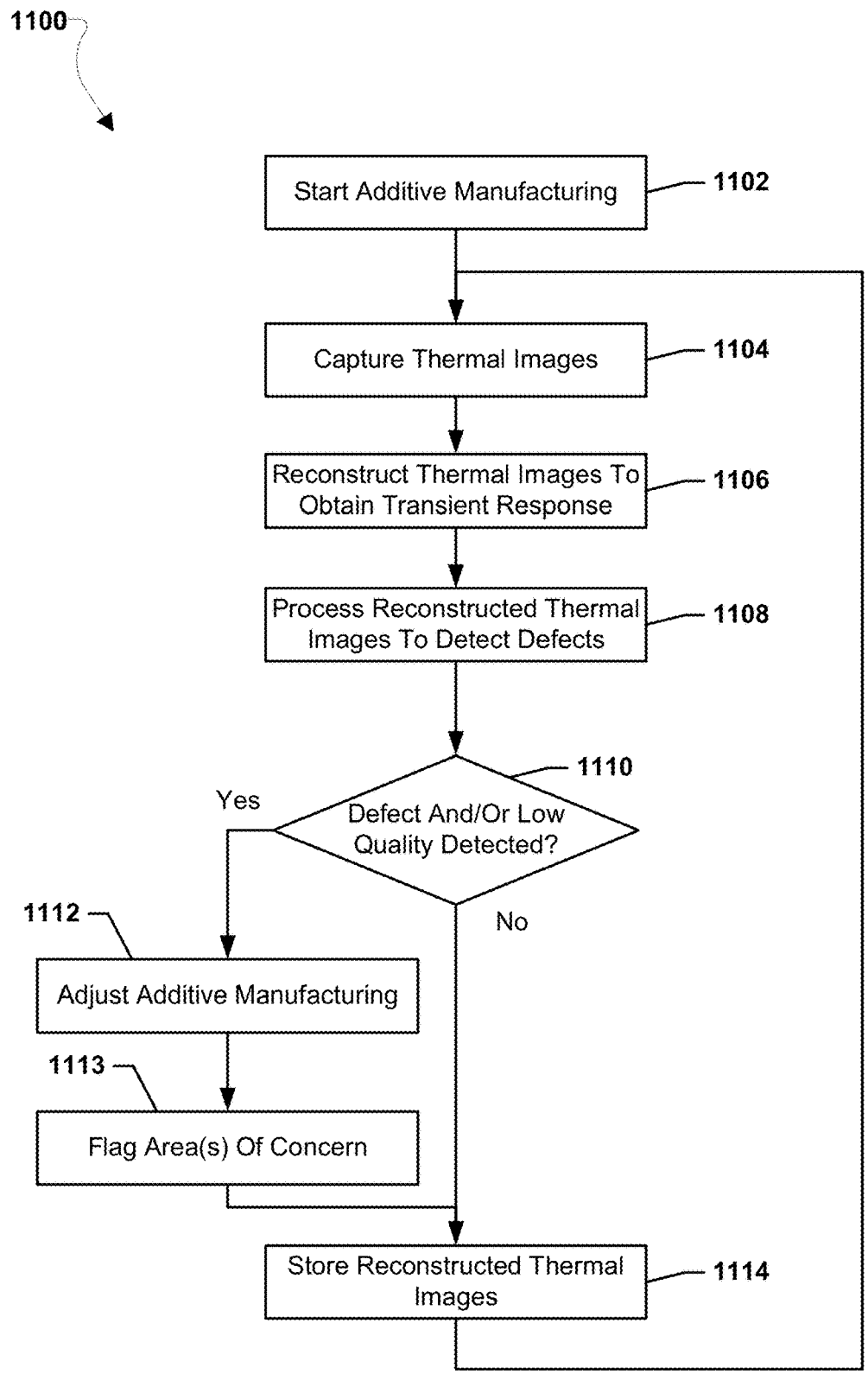
FIG. 11 is a process flow diagram illustrating an embodiment method for real time inspection of additive manufacturing deposits using infrared thermography.

FIG. 11 illustrates and embodiment method 1100 for real time inspection of additive manufacturing deposits using infrared thermography. In various embodiments the operations of method 1100 may be performed by one or more processor, such as the processor 201 connected to the one or more thermal imagers 206 discussed above with reference to FIGS. 2-10.

In block 1102 the processor may start additive manufacturing. For example, a heat source 203, such as an electron beam gun, laser, etc., may heat feedstock 211, such as a wire provided by a wire feeder 205, to liquefy the feedstock and deposit the molten feedstock on a base, such as base 208 and/or other previously deposited material. As part of additive manufacturing, the processor may control the movement of the deposition head, such as deposition head 202 and/or the table 202 such that material is deposited in preselected locations to buildup a structure (e.g., a part) layer by layer.

In block 1104 the processor may control the one or more thermal imagers, such as thermal images 206, to capture thermal images of the additive manufacturing process. For example, the thermal imagers may record temperature imagery along the entire build area layer by layer as material is deposited to buildup the structure (e.g., the part). In this manner, the entire thermal response of the deposition may be captured in the thermal images. The thermal images may be acquired sequentially in real time as the layers are laid down. The thermal images may capture the temperature changes as the melted deposited material cools down and solidifies.

In block 1106 the processor may reconstruct the thermal images to obtain the transient response of the structure (e.g., the part) being manufactured. To obtain the transient response for a given pixel within the acquired image data, reconstruction may be required. In various embodiments, reconstruction may include the images obtained sequentially in time being combined, such as any number of images 1-N for a given time period, to represent the entire deposit length spatially and temporally. For example, each acquired image may be shifted in the direction of travel and this may define each image within the data reconstructed image stack. For circular deposits, the images may be shifted in both X and Y directions. The transient response can then be obtained for pixel points in combined images. The intensity counts for the combined images may be plotted as a function of time for a given pixel point location. With radiometric calibration the intensity counts may be converted to temperature. The reconstructed thermal images may provide a measurement of temperature versus time along the build. Along the deposition, the temperature is shown to increase as the melt pool travels over a given pixel point. The metal solidifies at a constant temperature or pixel intensity after the melt pool passes over. Once solidification is complete the transient cool down response may be measured In block 1108 the reconstructed thermal images may be processed by the processor to detect defects and/or low quality areas in the structure build. For example, thermal models may be fitted to the reconstructed thermal images to determine the thermal properties of the deposition. The thermal models may be based on a moving point source of heat on a slab of finite thickness. If there is a defect, such as a crack between layers, then the conduction of heat will be restricted and therefore the layer thickness will be less thus providing and indication of a flaw. The rate of the transient cool down may be determined by the material thermal properties. Porosity may affect the thermal conductivity of a material.

In determination block 1110 the processor may determine whether any defects or low quality areas were detected. In response to determining defects or low quality areas are detected (i.e., determination block 1110="Yes"), the processor may adjust the additive manufacturing process conditions in block 1112. For example, the processor may control the feed rate(s) of the wire(s) and/or the heat of the heat source, to control the structural properties to prevent further defects/low quality areas and/or to account for the detected defects/low quality areas. In this manner, the build may be improved in real time using the thermal images.

In block 1113 the processor may flag area(s) of concern in the thermal images for post build inspection. The flagging may enable flags to be archived with the images and associated with the manufactured structure to document the manufactured structure's structural integrity.

In response to flagging areas of concern or in response to not finding defects (i.e., determination block 1110="No"), in block 1114 the processor may store the reconstructed thermal images. For example, the processor may store the images in a memory available to the processor. The stored images may be associated with the manufactured structure to document the manufactured structure's structural integrity. The processor may then proceed to block 1104 such that the additive manufacturing may be continually monitored and adjusted as needed in a closed control loop.

Figure 12A:
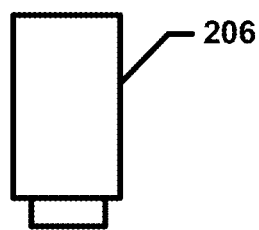
FIGS. 12A and 12B illustrate example thermal imager placements within the embodiment additive manufacturing system of FIG. 2A.
Figure 12A:
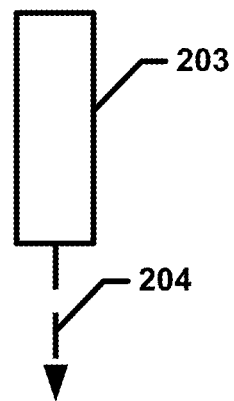
Figure 12B:
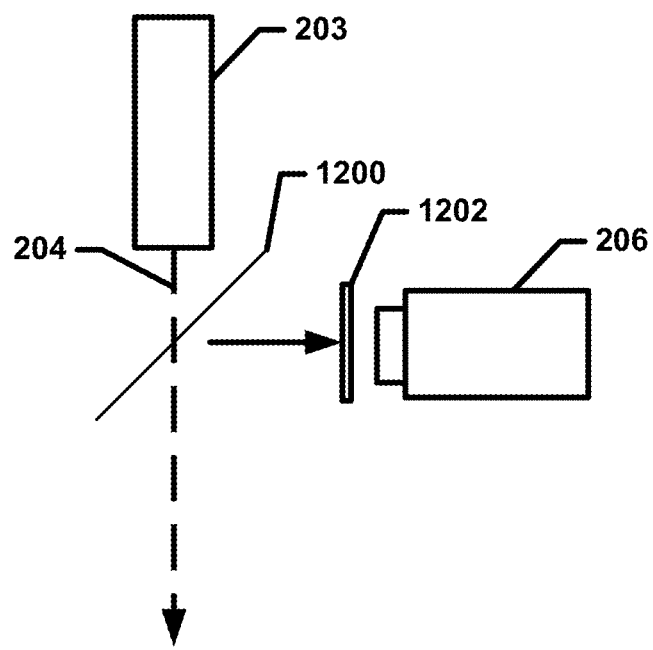

FIGS. 12A and 12B illustrate side views of example thermal imager 206 placements within the additive manufacturing system 200 of FIG. 2A. In the example configuration shown in FIG. 12A, the thermal imager 206, such as a camera, may be in-line with the heat energy 204 from the heat source 203, such as an electron beam gun, laser, etc. The thermal imager 206 may be viewing vertically and orthogonal to direction of travel viewing on top of the weld bead as it is deposited. This view may minimize adjacent wall blockage. The thermal imager 206 may view through a window in the heat source 203, such as an electron beam gun, straight through the heat source 203. In a similar manner, the example configuration shown in FIG. 12B may be used, for example, when the heat source 203 may be a laser. An angle beam splitter 1200 may be used with the thermal imager 206, such as a camera, having a filter 1202 to block the wavelength energy of the laser.

In the various embodiments described herein the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An additive manufacturing system, comprising:
   a deposition head comprising:
      a heat source;
      a wire feeder; and
      one or more thermal imagers configured to sequentially in time capture thermal images of deposition of feed material heated by the heat source to form a structure layer by layer; and
   a processor connected to the one or more thermal imagers, wherein the processor is configured to:
      reconstruct thermal images from the sequentially in time captured thermal images, wherein reconstructing the thermal images comprises combining a number of the sequentially in time captured thermal images of the deposition for a given time period by pixel point location in the sequentially in time captured thermal images such that the reconstructed thermal images represent the deposition's transient temperature response spatially across all the in line pixel points and temporally at each respective pixel point for the given time period;
      process the reconstructed thermal images to detect a defect in the structure based on the transient temperature response of at least one of the in line pixel points in the reconstructed thermal images; and
      adjust deposition of the feedstock or adjust the heat source in response to detecting the defect.

2. The system of claim 1, wherein the one or more thermal imagers are one or more infrared cameras.

3. The system of claim 2, wherein the one or more thermal imagers are two infrared cameras.

4. The system of claim 2, wherein the one or more thermal imagers are four infrared cameras.

5. The system of claim 2, wherein the processor is further configured to flag the detected defect and store the reconstructed thermal images including the flag.

6. The system of claim 2, wherein the transient temperature response of the at least one of the pixel points in the reconstructed thermal images is a temperature change over the given time period determined based at least in part on an intensity count of the at least one of the pixel points over the given time period.

7. The system of claim 6, wherein processing the reconstructed thermal images to detect the defect in the structure comprises comparing the reconstructed thermal images to a thermal model.

8. The system of claim 7, wherein the thermal model is a function of one or more of time, deposit direction, deposit velocity, thermal conductivity of the feed material, thermal diffusivity of the feed material, and deposit geometry.

9. The system of claim 2, wherein the captured thermal images provide full coverage of a build process including inner and outer walls of the deposition and capture the geometry of the deposition.

10. An additive manufacturing method, comprising:
    reconstructing thermal images from sequentially in time captured thermal images received from one or more thermal imagers configured to capture thermal images sequentially in time of deposition of feed material heated by a heat source to form a structure layer by layer, wherein reconstructing the thermal images from the sequentially in time captured thermal images comprises combining a number of sequentially in time captured thermal images of the deposition for a given time period by pixel point location in the sequentially in time captured thermal images such that the reconstructed thermal images represent the deposition's transient temperature response spatially across all the pixel points and temporally at each respective pixel point for the given time period;
    processing the reconstructed thermal images to detect a defect in the structure based on the transient temperature response of at least one of the pixel points in the reconstructed thermal images; and
    adjusting deposition of the feedstock or adjusting the heat source in response to detecting the defect.

11. The method of claim 10, wherein the one or more thermal imagers are one or more infrared cameras.

12. The method of claim 11, wherein the one or more thermal imagers are two infrared cameras.

13. The method of claim 11, wherein the one or more thermal imagers are four infrared cameras.

14. The method of claim 11, further comprising flagging the detected defect and storing the reconstructed thermal images including the flag.

15. The method of claim 11, wherein the transient temperature response of the at least one of the pixel points in the reconstructed thermal images is a temperature change over the given time period determined based at least in part on an intensity count of the at least one of the pixel points over the given time period.

16. The method of claim 11, wherein processing the reconstructed thermal images to detect the defect in the structure comprises comparing the reconstructed thermal images to a thermal model.

17. The method of claim 16, wherein the thermal model is a function of one or more of time, deposit direction, deposit velocity, thermal conductivity of the feed material, thermal diffusivity of the feed material, and deposit geometry.

18. The method of claim 11, wherein the captured thermal images provide full coverage of a build process including inner and outer walls of the deposition and capture the geometry of the deposition.

* * * * *